Patented Mar. 14, 1933

1,900,972

UNITED STATES PATENT OFFICE

WALTER BECKER, OF FEUDENHEIM, GERMANY, ASSIGNOR TO GENERAL ANILINE WORKS, INC., OF NEW YORK, N. Y., A CORPORATION OF DELAWARE

PURIFYING BENZANTHRONE

No Drawing.   Application filed January 25, 1929.  Serial No. 335,144.

In order to eliminate impurities from benzanthrone it is usually distilled from heated retorts by means of superheated steam. Even when carefully heating, compact masses are readily formed into which the steam does not any more penetrate, so that finally carbonization occurs.

I have now found that carbonization does not occur, but high yields of benzanthrone of excellent quality are obtained by mixing the crude product with non-volatile filling materials in particular such as have a good thermal conductivity, for instance, metals in the form of powder, filings or turnings, or with fine-grained minerals, such as sand, and distilling the benzanthrone from the mixture preferably while passing superheated steam or inert gases through the mixture. By the admixture of the said materials the heat supplied is uniformly distributed through the whole mass so that a regular distillation of the benzanthrone without losses is attained. The amount of filling material to be added depends on the thermal conductivity thereof. Generally speaking, an amount about equal in weight to the weight of the dry crude benzanthrone is sufficient.

The following example will further illustrate the nature of the said invention, but it is not restricted thereto.

Example 100 kilograms of moist crude benzanthrone are mixed with an amount of coarse iron turnings corresponding to the dry weight of the crude benzanthrone and are filled into the distilling vessel. The vessel is heated in about 1 hour to between 260 and 280° C. and kept at the said temperature until no longer vapors of benzanthrone pass over. Preferably steam heated to about 250° C. or indifferent gases heated to the same temperature are passed through the mass. The vapors are condensed in a chamber large enough to provide for sufficient cooling by the walls. 90 per cent of the amount of benzanthrone employed (calculated as pure product) are thus recovered while only 60 per cent are obtained without adding the iron turnings.

What I claim is:

1. A process of purifying crude benzanthrone, which comprises distilling from a directly heated retort crude benzanthrone to which comminuted iron has been added with the aid of superheated steam.

2. A process of purifying crude benzanthrone, which comprises distilling from a directly heated retort crude benzanthrone to which about an equal amount by weight of comminuted iron has been added with the aid of superheated steam.

In testimony whereof I have hereunto set my hand.

WALTER BECKER.